(12) United States Patent
Yamanaka et al.

(10) Patent No.: US 11,414,085 B2
(45) Date of Patent: Aug. 16, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hiroshi Yamanaka, Wako (JP); Yasushi Shoda, Wako (JP); Junpei Noguchi, Wako (JP); Yuki Hara, Wako (JP); Katsuyasu Yamane, Wako (JP); Yoshitaka Mimura, Wako (JP); Ryoma Taguchi, Tokyo (JP); Yuta Takada, Tokyo (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/817,648

(22) Filed: Mar. 13, 2020

(65) Prior Publication Data

US 2020/0307608 A1 Oct. 1, 2020

(30) Foreign Application Priority Data

Mar. 27, 2019 (JP) .............................. JP2019-059872

(51) Int. Cl.
*B60W 40/08* (2012.01)
*B60W 10/30* (2006.01)
(Continued)

(52) U.S. Cl.
CPC ............ *B60W 40/08* (2013.01); *B60W 10/04* (2013.01); *B60W 10/20* (2013.01); *B60W 10/30* (2013.01);
(Continued)

(58) Field of Classification Search
CPC ...... B60W 40/08; B60W 10/04; B60W 10/20; B60W 10/30; B60W 30/18027;
(Continued)

(56) References Cited

U.S. PATENT DOCUMENTS

2003/0107228 A1* 6/2003 Ono .......................... B60R 7/04
296/24.34
2003/0125855 A1* 7/2003 Breed .................... G06V 40/10
701/36
(Continued)

FOREIGN PATENT DOCUMENTS

DE 102015226697 6/2017
EP 3156291 4/2017
(Continued)

OTHER PUBLICATIONS

Japanese Office Action for Japanese Patent Application No. 2019-059872 dated Apr. 12, 2022.

*Primary Examiner* — Jonathan M Dager
*Assistant Examiner* — Jean W Charleston
(74) *Attorney, Agent, or Firm* — Amin, Turocy & Watson, LLP

(57) ABSTRACT

In a vehicle control device of an embodiment, a recognizer that recognizes the presence or absence and type of article carried by a user who uses a vehicle and an instrument controller that controls a vehicle-mounted instrument are included, and the instrument controller determines a mode of control of the vehicle-mounted instrument on the basis of a recognition result of the recognizer.

14 Claims, 14 Drawing Sheets

(51) Int. Cl.
  *B60W 10/20*  (2006.01)
  *B60W 50/14*  (2020.01)
  *B60W 30/18*  (2012.01)
  *B60W 10/04*  (2006.01)

(52) U.S. Cl.
  CPC ...... *B60W 30/18027* (2013.01); *B60W 50/14* (2013.01); *B60W 2554/20* (2020.02)

(58) Field of Classification Search
  CPC .. B60W 50/14; B60W 2554/20; B60W 30/12; B60W 30/143; B60W 30/16; B62D 15/0285; B60R 16/0231
  USPC .......................................................... 701/41
  See application file for complete search history.

(56) References Cited

U.S. PATENT DOCUMENTS

| | | | |
|---|---|---|---|
| 2016/0098088 A1* | 4/2016 | Park | B60K 35/00 |
| | | | 345/156 |
| 2018/0127165 A1* | 5/2018 | Smaldone | B65D 43/26 |
| 2019/0308612 A1* | 10/2019 | Lavoie | B62D 15/0285 |
| 2020/0047746 A1* | 2/2020 | Ji | B60W 30/0953 |
| 2020/0070814 A1* | 3/2020 | Park | G05D 1/0055 |
| 2020/0122722 A1* | 4/2020 | Ishioka | B60W 60/005 |
| 2020/0148219 A1* | 5/2020 | DeLuca | G06F 16/29 |
| 2020/0172100 A1* | 6/2020 | Kato | G08G 1/16 |

FOREIGN PATENT DOCUMENTS

| | | |
|---|---|---|
| JP | 2005-315024 | 11/2005 |
| JP | 2007-001724 | 1/2007 |
| JP | 2013-049417 | 3/2013 |
| JP | 2016-079692 | 5/2016 |
| JP | 2017-185954 | 10/2017 |
| JP | 2019-040630 | 3/2019 |

\* cited by examiner

FIG. 6
192
| TYPE OF ARTICLE | ARTICLE IMAGE | ... |
|---|---|---|
| DRINK CUP WITH LID | 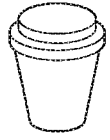 | ... |
| DRINK CUP WITH NO LID | 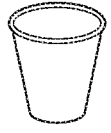 | ... |
| HANDBAG |  | ... |
| ICE CREAM |  | ... |
| WINEGLASS | 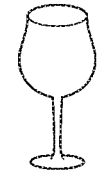 | ... |
| FISHING ROD | 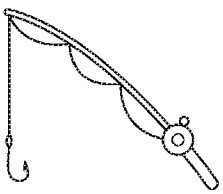 | ... |
| ... | ... | ... |

| TYPE OF ARTICLE | BODY CONTROL | AIR-CONDITIONING CONTROL | STANDBY POSITION (SHADE, UNDERGROUND) | DRIVING CONTROL (STARTING ACCELERATION SUPPRESSION) | SEAT ARRANGEMENT CHANGE |
|---|---|---|---|---|---|
| DRINK CUP WITH LID | OPEN SLIDE DOOR | UNNECESSARY | UNNECESSARY | UNNECESSARY | UNNECESSARY |
| DRINK CUP WITH NO LID | OPEN POWER WINDOW | UNNECESSARY | UNNECESSARY | NECESSARY | UNNECESSARY |
| HANDBAG | OPEN HINGE DOOR | UNNECESSARY | UNNECESSARY | UNNECESSARY | UNNECESSARY |
| ICE CREAM | OPEN SLIDE DOOR | NECESSARY (COOL TEMPERATURE) | NECESSARY | UNNECESSARY | UNNECESSARY |
| WINEGLASS | OPEN HINGE DOOR | UNNECESSARY | UNNECESSARY | NECESSARY | UNNECESSARY |
| FISHING ROD | OPEN REAR HATCH | UNNECESSARY | UNNECESSARY | UNNECESSARY | NECESSARY |
| ... | ... | ... | ... | ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-059872, filed Mar. 27, 2019, the content of which is incorporated herein by reference.

BACKGROUND OF THE INVENTION

Field of the Invention

The present invention relates to a vehicle control device, a vehicle control method, and a storage medium.

Description of Related Art

In recent years, there has been progress in research for automatic control of a vehicle. In connection with this, a technique for notifying a user of misplacement of an article that the user has taken into a vehicle, executing opening of a door or arrangement of seats, and supporting the loading of an article has been disclosed (for example, Japanese Unexamined Patent Application, First Publication No. 2007-1724). In addition, a technique for, in a case where it is estimated that both hands of a user near the door of a vehicle are full, controlling an opening operation or a closing operation of a door to keep the user from feeling annoyed with opening and closing of the door has been disclosed (for example, Japanese Unexamined Patent Application, First Publication No. 2016-79692). In addition, a technique for stopping an automated driving vehicle at a position appropriate for a user depending on an article carried by the user during automated exit has been disclosed (for example, Japanese Unexamined Patent Application, First Publication No. 2017-185954).

SUMMARY

However, in the related art, controlling a vehicle-mounted instrument to open a door or a power window or execute the arrangement of seats in accordance with the type of article carried by a user has not been sufficiently considered.

The present invention was contrived in view of such circumstances, and one object thereof is to provide a vehicle control device, a vehicle control method, and a storage medium that make it possible to appropriately control a vehicle-mounted instrument in accordance with the type of article carried by a user.

A vehicle control device, a vehicle control method, and a storage medium according to this invention have the following configurations adopted therein.

(1) According to an aspect of this invention, there is provided a vehicle control device including: a recognizer that recognizes the presence or absence and type of article carried by a user who uses a vehicle; and an instrument controller that controls a vehicle-mounted instrument, wherein the instrument controller determines a mode of control of the vehicle-mounted instrument on the basis of a recognition result of the recognizer.

(2) In the aspect of the above (1), the instrument controller is able to control a plurality of opening and closing mechanisms of the vehicle, and determines an opening and closing mechanism to be opened and closed among the plurality of opening and closing mechanisms on the basis of the recognition result of the recognizer.

(3) In the aspect of the above (2), in a case where it is recognized by the recognizer that the user holds a drink, the instrument controller determines an opening and closing mechanism to be opened and closed among the plurality of opening and closing mechanisms on the basis of whether a lid is attached to a container that contains the drink.

(4) In the aspect of the above (2), some or all of a hinge door, a slide door, a power window, and a rear hatch of the vehicle are included in the opening and closing mechanism.

(5) In the aspect of the above (2), the instrument controller drives a seat mechanism of the vehicle, and drives, in a case where an article that is a long object is recognized by the recognizer, in a mode in which the long object is able to be received.

(6) In the aspect of the above (5), in a case where the users and the articles which are on board a vehicle having a predetermined number of seats are recognized by the recognizer, the instrument controller drives the seat mechanism in a mode in which all the users and all the articles are able to be received in the vehicle.

(7) In the aspect of the above (6), in a case where the seat mechanism is driven in the mode in which all the users and all the articles are able to be received in the vehicle, the instrument controller notifies the users of a loading order of the articles and a boarding orders of the users.

(8) In the aspect of the above (5), the recognizer further recognizes a peripheral situation of the vehicle, the vehicle control device further includes a driving controller that controls steering and speed of the vehicle irrespective of the user's operation on the basis of a recognition result of the peripheral situation of the recognizer, the instrument controller sets a boarding and exit route of the user according to driving of the seat mechanism, and the driving controller stops the vehicle so that the opening and closing mechanism and the user according to the boarding and exit route approach each other in a stop area in which the user boards the vehicle.

(9) In the aspect of the above (8), a notifier that notifies an external device of information relating to the vehicle is further included, and in a case where the article recognized by the recognizer amounts to a predetermined amount or more, the notifier requests the external device to suppress an amount of travel of another vehicle near the vehicle.

(10) In the aspect of the above (8), the instrument controller is able to control an air-conditioning device, and lowers a temperature of an interior of the vehicle by controlling the air-conditioning device in a case where it is recognized by the recognizer that the article is an article vulnerable to a predetermined high temperature.

(11) In the aspect of the above (10), the driving controller determines a stop position at which the temperature of the interior of the vehicle of the vehicle is easy to maintain at a cool temperature as a stop position of the vehicle.

(12) In the aspect of the above (8), when the vehicle is started with the user and the article loaded, the driving controller changes a degree of starting acceleration of the vehicle in accordance with the type of article recognized by the recognizer.

(13) In the aspect of the above (12), a notifier that notifies an external device of information relating to the vehicle is further included, and the notifier requests the external device to suppress an amount of travel of another vehicle near the vehicle in a case where the degree of starting acceleration is changed by the driving controller.

(14) According to an aspect of this invention, there is provided a vehicle control method including causing a vehicle control device to: recognize the presence or absence and type of article carried by a user who uses a vehicle; and determine a mode of control of a vehicle-mounted instrument on the basis of a recognition result.

(15) According to an aspect of this invention, there is provided a computer readable non-transitory storage medium having a program stored therein, the program causing a vehicle control device to: recognize the presence or absence and type of article carried by a user who uses a vehicle; and determine a mode of control of a vehicle-mounted instrument on the basis of a recognition result.

According to the aspects of the above (1) to (15), it is possible to control an appropriate mode of use of a vehicle-mounted instrument in accordance with the type of article carried by a user.

BRIEF DESCRIPTION OF THE DRAWINGS

FIG. 6 is a diagram illustrating an example of article type information.

FIG. 7 is a diagram illustrating an example of control content for each article type.

DESCRIPTION OF EMBODIMENTS

Hereinafter, an embodiment of a vehicle control device, a vehicle control method, and a storage medium of the present invention will be described with reference to the accompanying drawings.

[Overall Configuration]

Figure 1:
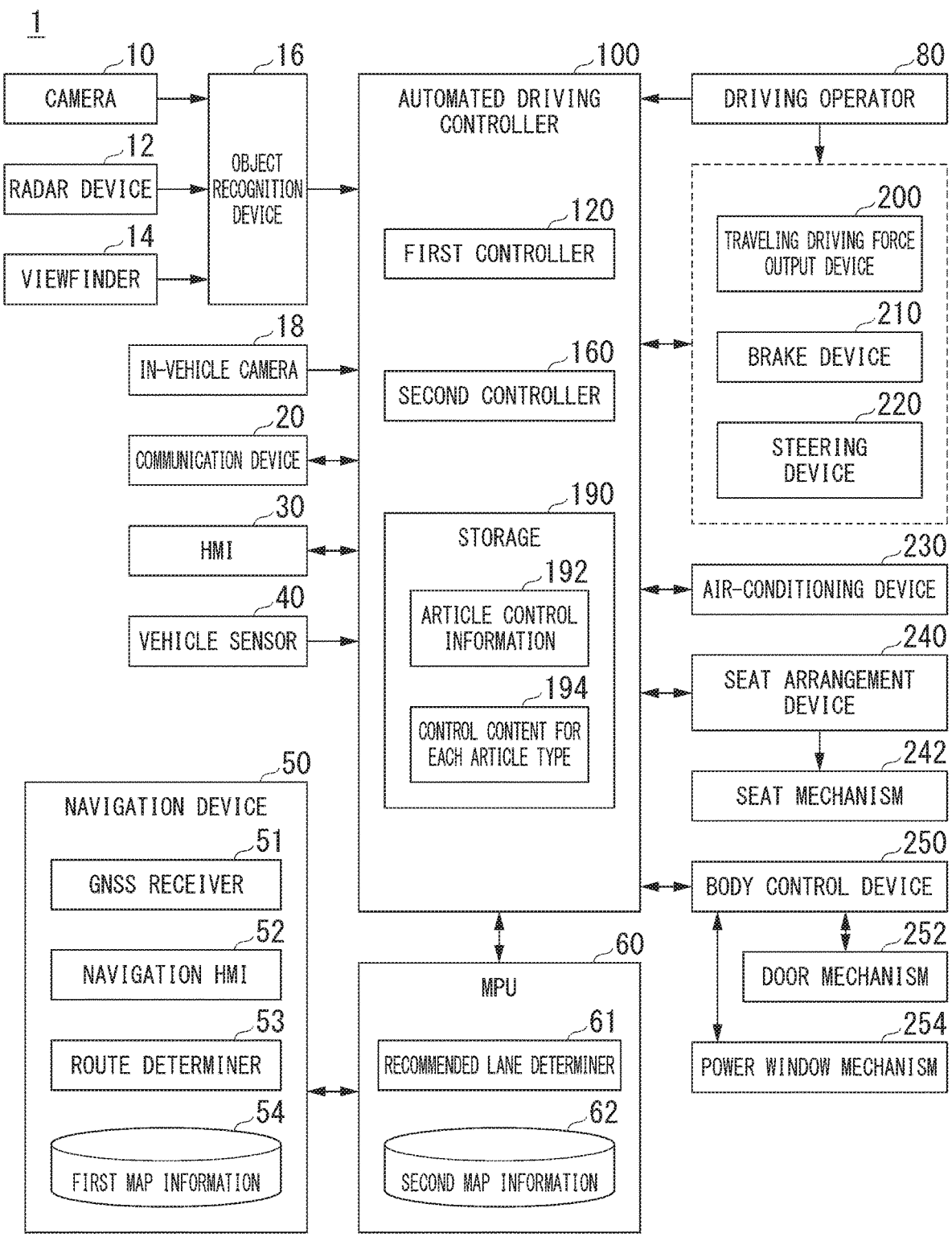
FIG. 1 is a configuration diagram of a vehicle system using a vehicle control device according to an embodiment.

FIG. 1 is a configuration diagram of a vehicle system 1 in which a vehicle control device according to an embodiment is used. For the purpose of the present invention, a vehicle is not limited to an automated driving vehicle, and the automated driving vehicle will be described by way of example only. A vehicle having the vehicle system 1 mounted therein is, for example, a two-wheeled, three-wheeled, or four-wheeled vehicle or the like, and the driving source thereof is an electric motor, or a combination of an internal-combustion engine such as a diesel engine or a gasoline engine and the electric motor. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, an in-vehicle camera 18, a communication device 20, a human machine interface (HMI) 30, a vehicle sensor 40, a navigation device 50, a map positioning unit (MPU) 60, a driving operator 80, an automated driving controller 100, a storage 190, a traveling driving force output device 200, a brake device 210, a steering device 220, an air-conditioning device 230, a seat arrangement device 240, and a body control device 250. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. The automated driving controller 100 is an example of a "vehicle control device."

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein (hereinafter referred to as a vehicle M). In a case where a forward image is captured, the camera 10 is installed on the upper portion of the front windshield, the rear surface of the rear-view mirror, or the like. The camera 10, for example, repeatedly captures an image of the vicinity of the vehicle M periodically. The camera 10 may be a stereo camera.

The radar device 12 radiates radio waves such as millimeter waves to the vicinity of the vehicle M, and detects radio waves (reflected waves) reflected from an object to detect at least the position (distance to and orientation of) of the object. The radar device 12 is installed at any point of the vehicle M. The radar device 12 may detect the position and speed of an object with a frequency modulated continuous wave (FM-CW) system.

The viewfinder 14 is a light detection and ranging (LI-DAR) viewfinder. The viewfinder 14 irradiates the vicinity of the vehicle M with light, and measures scattered light. The viewfinder 14 detects a distance to an object on the basis of a time from light emission to light reception. The irradiation light is, for example, pulsed laser light. The viewfinder 14 is installed at any point on the vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition result to the automated driving controller 100. The object recognition device 16 may output the detection results of the camera 10, the radar device 12, and the viewfinder 14, as they are, to the automated driving controller 100. The object recognition device 16 may be omitted from the vehicle system 1.

The in-vehicle camera 18 is a digital camera using a solid-state imaging element such as, for example, a CCD or a CMOS. The in-vehicle camera 18 is installed at any point on the vehicle M, and images the interior of the vehicle M. Examples of spaces imaged by the in-vehicle camera 18 include the periphery or a seat or a door pocket, a sun visor, a cup holder, or the like. The in-vehicle camera 18 captures, for example, an image of the interior of the vehicle M periodically repeatedly. The in-vehicle camera 18 may be a stereo camera.

The communication device 20 communicates with another vehicle or another device which is present in the periphery of the vehicle M using, for example, a cellular network, a Wi-Fi network, Bluetooth (registered trademark), dedicated short range communication (DSRC), or the like. The communication device 20 is an example of a "notifier."

The HMI 30 presents various types of information to a user of the vehicle M, and accepts the user's input operation. The HMI 30 includes various display devices, a speaker, a buzzer, a touch panel, a switch, a key, and the like.

The vehicle sensor 40 includes a vehicle speed sensor that detects the speed of the vehicle M, an acceleration sensor that detects an acceleration, a yaw rate sensor that detects an angular velocity around a vertical axis, an orientation sensor that detects the direction of the vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies the position of the vehicle M on the basis of a signal received from a GNSS satellite. The position of the vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the vehicle M specified by the GNSS receiver 51 to a destination input by a user using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by a user. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving controller 100, or some or all of the traveling driving force output device 200, the brake device 210, and the steering device 220.

The automated driving controller 100 includes, for example, a first controller 120, a second controller 160, and a storage 190. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the storage 190 in advance, may be stored in a detachable storage medium such as a DVD or a CD-ROM, or may be installed in the HDD or the flash memory of the storage 190 by the storage medium (the non-transitory storage medium) being mounted in a drive device.

The storage 190 is realized by, for example, an HDD, a flash memory, an electrically erasable programmable read only memory (EEPROM), a read only memory (ROM), a random access memory (RAM), or the like. The storage 190 stores, for example, a program which is read out and executed by a processor, article type information 192, control content for each article type 194, or the like. The article type information 192 and the control content for each article type 194 will be described later.

Figure 2:
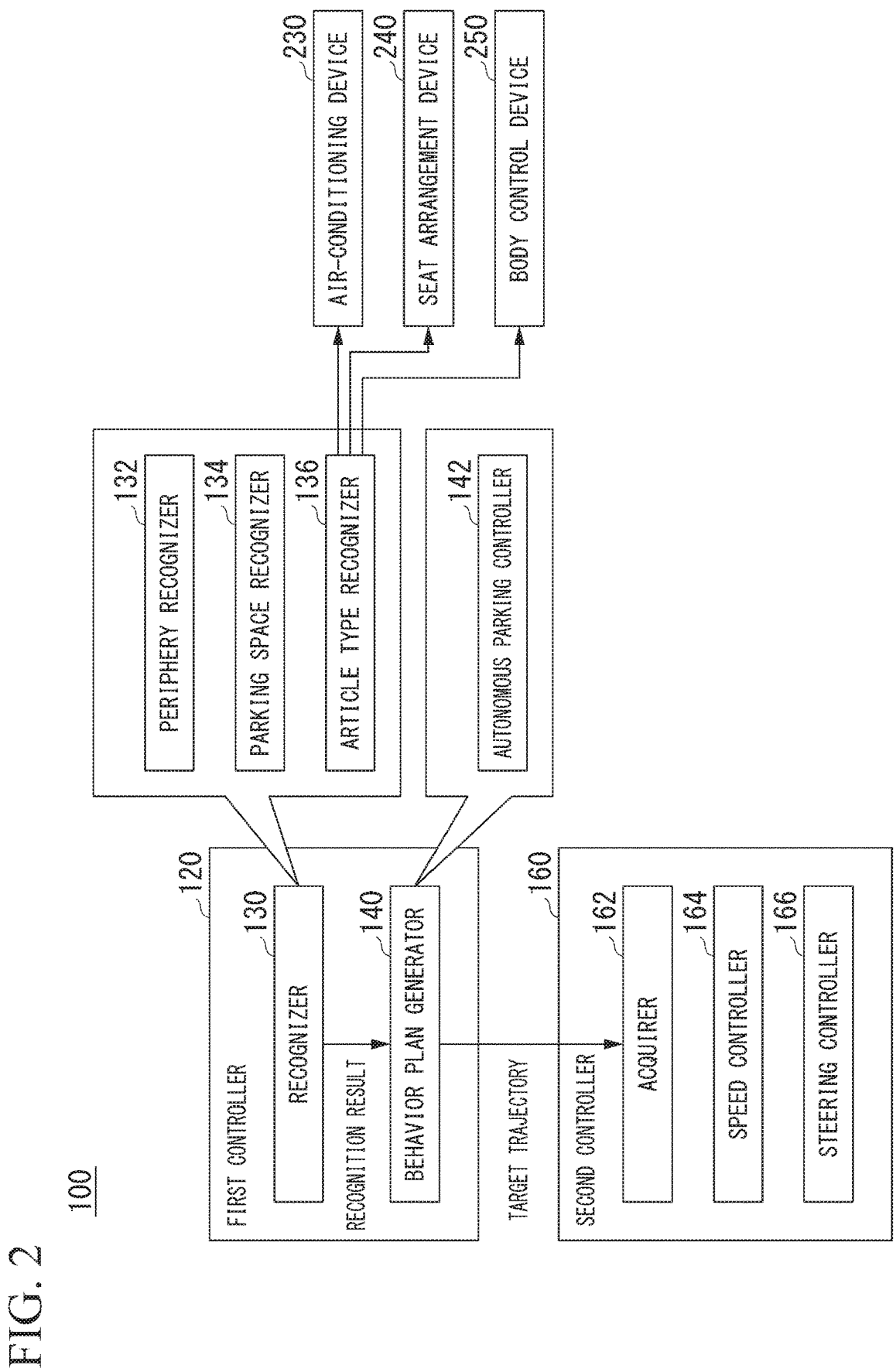
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured. A controller having both the first controller 120 and the second controller 160 is an example of a "driving controller."

The recognizer 130 includes a periphery recognizer 132, a parking space recognizer 134, and an article type recognizer 136. The periphery recognizer 132 recognizes the position and speed of an object near the host vehicle M, and the state of acceleration or the like on the basis of information which is input from the camera 10, the radar device 12, and the viewfinder 14 through the object recognition device 16. The position of the object is recognized as, for example, a position in absolute coordinates with a representative point (such as the centroid or the center of a drive shaft) of the vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The periphery recognizer 132 recognizes, for example, a lane (traveling lane) along which the vehicle M travels. For example, the periphery recognizer 132 may recognize a traveling lane by comparing a pattern of a road partition line (for example, an array of solid lines and broken lines) obtained from the second map information 62 with a pattern of a road partition line located in the vicinity of the vehicle M which is recognized from an image captured by the camera 10. The periphery recognizer 132 may recognize a traveling lane by recognizing a driving boundary (road boundary) including a road partition line, a shoulder, a curbstone, a median strip, a guardrail, or the like without being limited to the recognition of a road partition line. In this recognition, the position of the vehicle M acquired from the navigation device 50 or processing results based on an INS may be added. The periphery recognizer 132 recognizes a stop line, an obstacle, a red light, a tollbooth, and other road events.

Upon recognizing a traveling lane, the periphery recognizer 132 recognizes the position or posture of the vehicle M with respect to the traveling lane. The periphery recognizer 132 may recognize, for example, deviation of the vehicle M from the center of the lane which is a reference point, and an angle formed with respect to a line aligned along the center of the lane of the vehicle M in its traveling direction, as the relative position and posture of the vehicle M with respect to the traveling lane. Instead, the recognizer 130 may recognize the position of the reference point of the vehicle M or the like with respect to either lateral end portion (a road partition line or a road boundary) of the traveling lane, as the relative position of the vehicle M with respect to the traveling lane.

The periphery recognizer 132 may previously acquire information of an object which is highly like to be recognized by the camera 10 after the elapse of a predetermined time by broadly recognizing the peripheral situation of the vehicle M on the basis of the result of communication with another vehicle or an external device (such as, for example, a parking lot management device 400).

The details of the functions of the parking space recognizer 134 and the article type recognizer 136 will be described later.

The behavior plan generator 140 generates a target trajectory along which the vehicle M will travel in the future automatically (irrespective of a driver's operation) so that the vehicle M travels in the recommended lane determined by the recommended lane determiner 61 in principle and can cope with the peripheral situation of the vehicle. The target trajectory includes, for example, a speed element. For example, the target trajectory may be represented as a trajectory obtained by arranging points (trajectory points) at which the vehicle M will arrive in order. The trajectory points are points at which the vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the vehicle M will arrive at sampling times for respective predetermined sampling times. In this case, information of a target speed or target acceleration is represented by an interval between trajectory points.

The behavior plan generator 140 determines an event of automated driving in a route in which a recommended lane is determined. The event is information in which a traveling mode of the vehicle M is specified. The term "automated driving" refers to controlling one or both of the steering or speed of the vehicle M irrespective of the operation of the driving operator 80 which is performed by a user of the vehicle M and causing the vehicle M to travel. On the other hand, the term "manual driving" refers to the steering and speed of the vehicle M being controlled in accordance with a user's operation of the driving operator 80. The event of automated driving is a mode of behavior which is taken by the vehicle M under the above-described automated driving, that is, information in which a traveling mode is specified.

The events includes, for example, a parking event of causing the vehicle M to travel autonomously and be parked in a parking space as in valet parking rather than a user of the vehicle M parks the vehicle M in the parking space by himself (or herself), a stop event of stopping the vehicle M on the spot, a forward event of moving the vehicle M forward while slowing the vehicle down, a backward event of moving the vehicle M backward while slowing the vehicle down.

The events may include, for example, a constant-speed traveling event of causing the vehicle M to travel in the same lane at a constant speed, a following traveling event of causing the vehicle M to follow another vehicle (hereinafter referred to as a preceding vehicle) which is present within a predetermined distance (within, for example, 100 [m]) in front of the vehicle M and is closest to the vehicle M, a lane change event of changing the lane of the vehicle M from a host lane to an adjacent lane, a divergence event of causing the vehicle M to diverge in an objective lane at a divergence point of a road, a merging event of causing the vehicle M to merge into a main line at a merging point, a passing event of temporarily changing the lane of the vehicle M in an adjacent lane, passing a preceding vehicle in the adjacent lane and then changing the lane to an original lane again, an avoidance event of causing the vehicle M to perform at least one of braking and steering in order to avoid an obstacle which is present in front of the vehicle M, an overtaking event of terminating automated driving and switching the automated driving to manual driving, and the like. The term "following" may be, for example, a traveling mode of maintaining a relative distance (inter-vehicle distance) between the vehicle M and a preceding vehicle constant, or may be a traveling mode of causing the vehicle M to travel in the center of a host lane in addition to maintaining the relative distance between the vehicle M and a preceding vehicle constant.

The behavior plan generator 140 may change an event already determined with respect to the current section or the next section to another event in accordance with a peripheral situation recognized by the recognizer 130 during traveling of the vehicle M, or may determine a new event with respect to the current section or the next section.

The behavior plan generator 140 generates a future target trajectory along which the vehicle M is caused to travel automatically (irrespective of a driver's operation) in a traveling mode specified by an event so that the vehicle M travels in a recommended lane determined by the recommended lane determiner 61 in principle and copes with its peripheral situation when the vehicle M travels the recommended lane. The target trajectory includes, for example, a position element for determining a future position of the vehicle M and a speed element for determining a future speed, acceleration or the like of the vehicle M.

For example, the behavior plan generator 140 determines a plurality of points (trajectory points) at which the vehicle M will arrive in order as position elements of a target trajectory. The trajectory points are points at which the vehicle M will arrive after predetermined traveling distances (for example, approximately every several [m]). The predetermined traveling distances may be calculated by, for example, a distance along a road when advancing along a route.

The behavior plan generator 140 determines a target speed or a target acceleration for each predetermined sampling time (for example, approximately several tenths of a second) as speed elements of a target trajectory. The trajectory points may be positions at which the vehicle M will arrive at sampling times for respective predetermined sampling times. In this case, the target speed or the target acceleration is determined by intervals between sampling times and trajectory points. The behavior plan generator 140 outputs information indicating the generated target trajectory to the second controller 160.

The behavior plan generator 140 includes, for example, an autonomous parking controller 142 to be started up in a case where the autonomous parking event is executed. The details of the function of the autonomous parking controller 142 will be described later.

Referring back to FIG. 1, the second controller 160 controls the traveling driving force output device 200, the brake device 210, and the steering device 220 so that the vehicle M passes along the target trajectory generated by the behavior plan generator 140 according to scheduled times.

Referring back to FIG. 2, the second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

The air-conditioning device 230 adjusts the environment in the interior of a vehicle by adjusting the state of air in the interior of the vehicle. The operation of the air-conditioning device 230 is controlled by, for example, an air conditioner ECU accepting a user's operation.

The seat arrangement device 240 controls, for example, the arrangement of seats in the interior of the vehicle by controlling the seat mechanism 242, and controls a change of the seat arrangement (such as, for example, a change of the angle of a backrest, a change of slide state (seat position), or expansion of a storage space by folding up a seat).

The body control device 250 controls, for example, a door mechanism 252 and a power window mechanism 254. The body control device 250 may control only the power window mechanism 254. The air-conditioning device 230, the seat arrangement device 240, and the body control device 250 are an example of an "instrument controller." The door mechanism 252 and the power window mechanism 254 are an example of an "opening and closing mechanism."

The door mechanism 252 includes, for example, a door locking device that sets one or more hinge doors of the vehicle M to be in a door locking state or a door unlocking state. In a case where the vehicle M has a slide door, the door mechanism 252 includes a door locking device of the slide door and an opening and closing device of the slide door. In a case where the vehicle M has a rear hatch door, the door mechanism 252 includes a door locking device of the rear hatch door and an opening and closing device of the rear hatch door.

The power window mechanism 254 includes, for example, a driving device of one or more power windows of the vehicle M, and opens and closes the window portions (windows) of the vehicle M.

Figure 3:
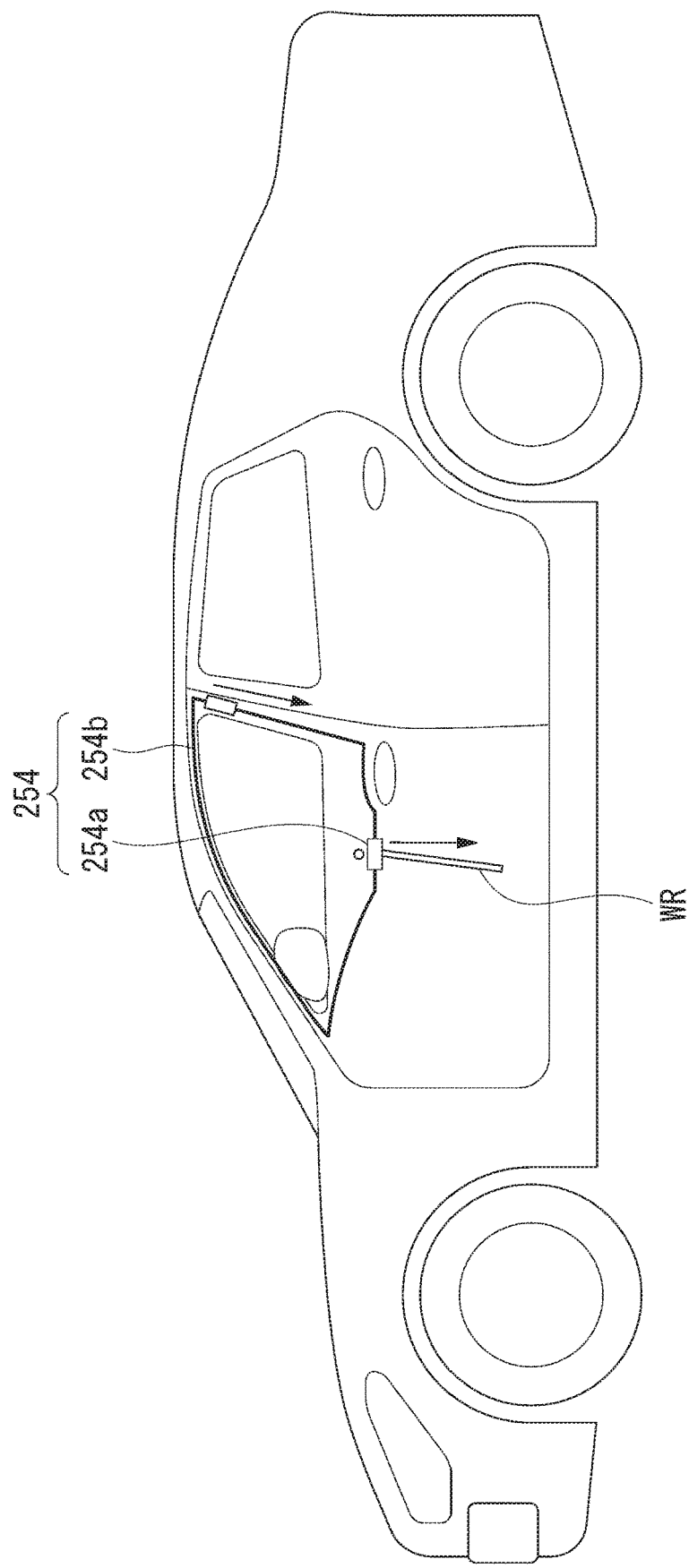
FIG. 3 is a diagram illustrating an example of an outward appearance of a power window mechanism.

FIG. 3 is a diagram illustrating an example of an outward appearance of the power window mechanism 254. As shown in FIG. 3, the power window mechanism 254 includes, for example, a window portion 254a and a driver 254b. The window portion 254a and the driver 254b are fixed to each other, and the window portion 254a is moved (opened and closed) in a vertical direction by the driver 254b moving along a rail WR on the basis of control performed by the body control device 250. The door mechanism 252 is not shown in the drawing.

[Autonomous Parking Event—During Entry]

Figure 4:
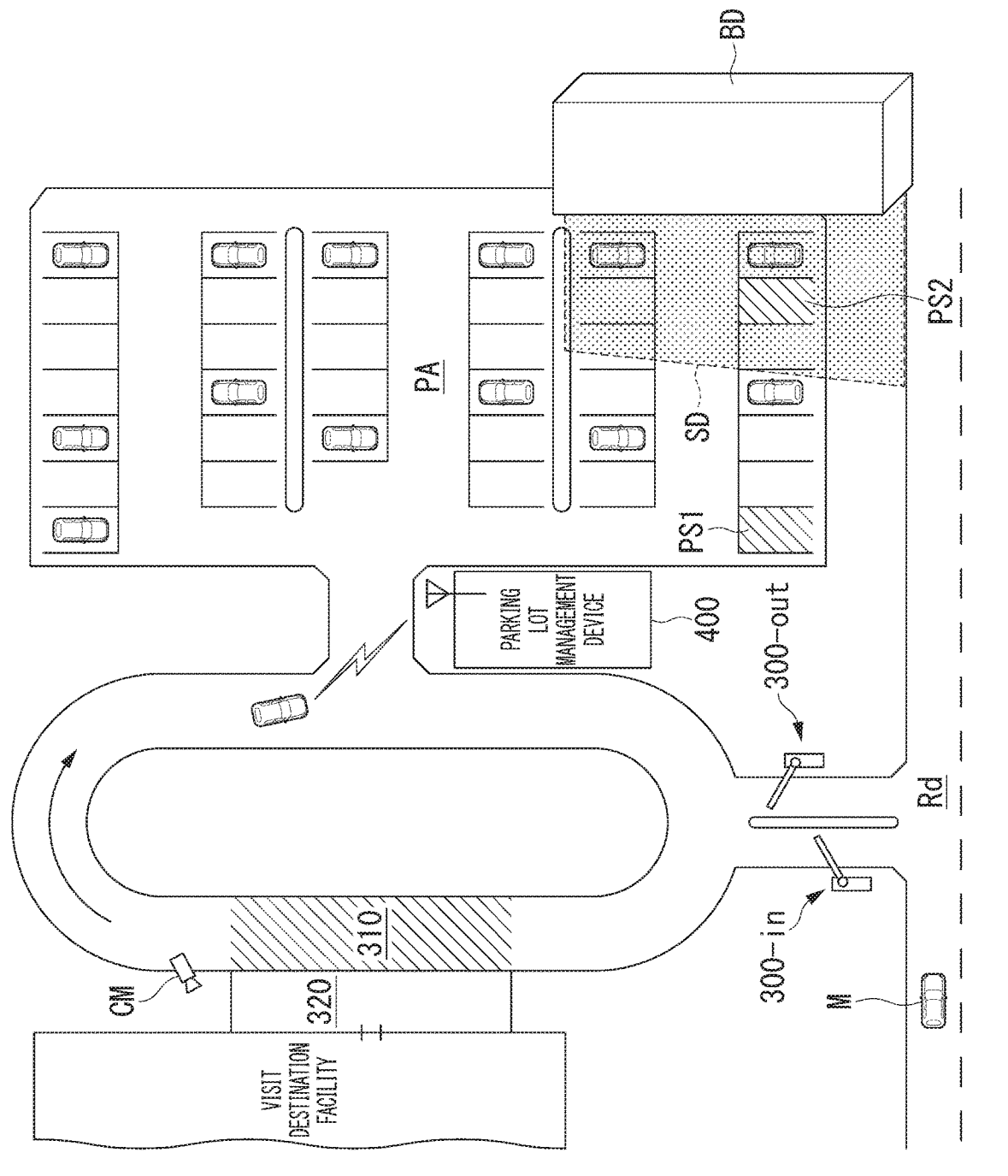
FIG. 4 is a diagram schematically illustrating a situation in which an autonomous parking event is executed.

The autonomous parking controller 142 parks the host vehicle M within a parking space, for example, on the basis of information acquired from a parking lot management device 400 by the communication device 20. FIG. 4 is a diagram schematically illustrating a situation in which the autonomous parking event is executed. Gates 300-in and 300-out are provided on a route from a road Rd to a visit destination facility. The host vehicle M advances to a stop area 310 through the gate 300-in by manual driving or automated driving. The stop area 310 faces a pickup area 320 which is connected to the visit destination facility. The pickup area 320 is provided with eaves for blocking rain or snow. A shade SD is produced in a portion of a parking area PA by a building BD adjacent to the parking area PA. A camera CM for imaging a user in the pickup area 320 is provided. An image captured by the camera CM is transmitted to, for example, the parking lot management device 400 or each vehicle, and is used for recognition of a user.

The vehicle M performs automated driving in an unmanned manner after a user exits the vehicle in the stop area 310, and starts the autonomous parking event for movement to a parking space PS1 or a parking space PS2 within the parking area PA. A start trigger of the autonomous parking event may be, for example, some kind of operation performed by a user, or may be wireless reception of a predetermined signal from the parking lot management device 400. In a case where the autonomous parking event is started, the autonomous parking controller 142 controls the communication device 20 and transmits a request for parking toward the parking lot management device 400. The vehicle M moves from the stop area 310 to the parking area PA in accordance with the guidance of the parking lot management device 400 or while performing sensing by itself. The autonomous parking event during entry may include the movement of a parking space while the vehicle M stands by, for example, the movement to an empty space close to the pickup area 320, or the movement to the shade or an empty space of an underground parking lot in which the temperature of the interior of the vehicle M is easy to maintain.

Figure 5:
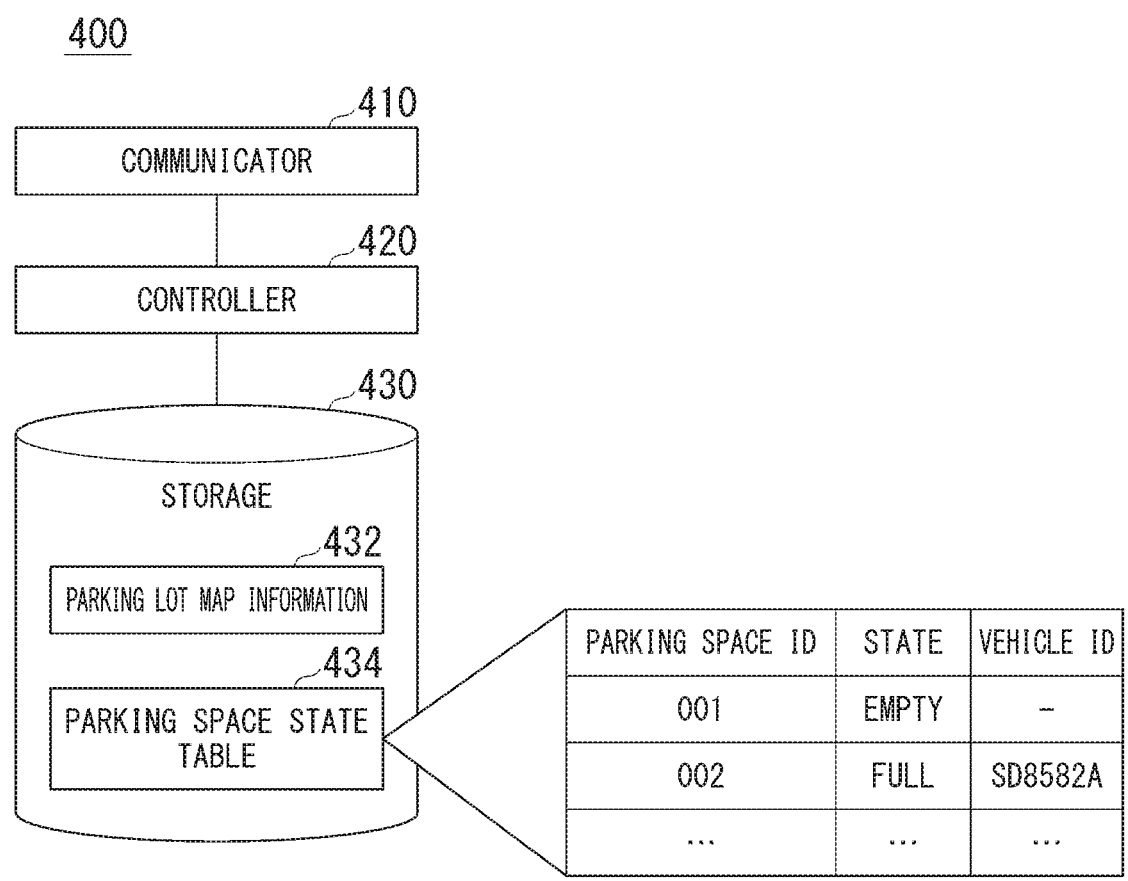
FIG. 5 is a diagram illustrating an example of a configuration of a parking lot management device.

FIG. 5 is a diagram illustrating an example of a configuration of the parking lot management device 400. The parking lot management device 400 includes, for example, a communicator 410, a controller 420, and a storage 430. The storage 430 stores information such as parking lot map information 432 and a parking space state table 434.

The communicator 410 communicates with the vehicle M and other vehicles wirelessly. The controller 420 guides a vehicle to an empty parking space (for example, the parking space PS1 or the parking space PS2 which are shown) on the basis of information acquired by the communicator 410 and information stored in the storage 430. The parking lot map information 432 is information geometrically indicating the structure of the parking area PA. The parking lot map information 432 includes coordinates for each parking space. The parking space state table 434 is, for example, a table in which a state indicating an empty state or a full (parked) state with respect to a parking space ID which is identification information of the parking space and a vehicle ID which is identification information of a parked vehicle in the case of a full state are associated with each other.

In a case where the communicator 410 receives a request for parking from a vehicle, the controller 420 refers to the parking space state table 434, to extract a parking space of which the state is an empty state, acquire the position of the extracted parking space from the parking lot map information 432, and transmit a suitable route to the acquired position of the parking space to the vehicle using the communicator 410. The controller 420 instructs a specific vehicle to stop, slow down, or the like as necessary on the basis of positional relationships between a plurality of vehicles so that the vehicles do not advance to the same position simultaneously.

In the vehicle that has received a route (hereinafter referred to as the vehicle M), the autonomous parking controller 142 generates a target trajectory based on the route. In a case where the parking space which is a target approaches, the parking space recognizer 134 recognizes a parking frame line or the like for partitioning the parking space, recognizes the detailed position of the parking space (for example, the shown parking space PS1), and provides the recognized position to the autonomous parking controller 142. The autonomous parking controller 142 receives this to correct the target trajectory, and parks the vehicle M in the parking space PS.

Without being limited to the above description, the autonomous parking controller 142 may find a parking space in an empty state by itself on the basis of the result of detection performed by the camera 10, the radar device 12, the viewfinder 14, or the object recognition device 16 irrespective of communication, and park the vehicle M within the found parking space.

[Recognition of Article Type]

The article type recognizer 136 recognizes the presence or absence and type of article carried by a user who uses the vehicle M. A user associated with an article which is recognized by the article type recognizer 136 is, for example, a user recognized to board the vehicle M or exit the vehicle M by the recognizer 130. The article type recognizer 136 recognizes, for example, an article carried by a user who uses the vehicle M (such as, for example, a drink cup containing a drink, a handbag, or a paper bag), refers to the article type information 192 to recognize the type of article, and refers to the control content for each article type 194 to output a control instruction based on a recognition result to some or all of the air-conditioning device 230, the seat arrangement device 240, the body control device 250, the behavior plan generator 140, and the autonomous parking controller 142.

FIG. 6 is a diagram illustrating an example of the article type information 192. The article type information 192 is, for example, a learned model such as a convolution neural network (CNN) learned in advance by machine learning, and a type is output when an image is input. Since the cutout sizes of images are different from each other, information such as a window size may be associated with the type of article. Instead, information (parameters or an algorithm) for recognizing a type using a method such as pattern matching may be used.

The article type recognizer 136 further adds other information (such as, for example, behavior information of a user in a visit destination facility or the like) in addition to the article type information 192, whereby the recognition of the type of article may be performed using information which is not likely to be discriminated in an image such as the material or weight of an article.

FIG. 7 is a diagram illustrating an example of the control content for each article type 194. The control content for each article type 194 is, for example, information in which instrument control is associated with the type of article. In the control content for each article type 194, setting as to whether the air-conditioning device 230 is caused to control the air conditioner ECU, setting as to whether the seat arrangement device 240 is caused to control a seat mechanism, setting as to whether the body control device 250 is controlled, control content of each device, and the like associated with each other in accordance with the type of article recognized by the article type recognizer 136. These settings may be set in advance by a seller or a manager when the vehicle M is purchased, or may be configured such that the type of article or the size of the article is recognized by recognizing a user's article from an image of the interior of the vehicle captured by the in-vehicle camera 18 whenever the user boards the vehicle M, the user's manual instrument control is then learned, and control content is associated with a type.

For example, in a case where a drink cup with a lid (an example of a container that contains a drink) is recognized as an article carried by a user of the vehicle M, the article type recognizer 136 refers to the control content for each article type 194 to determine that a slide door is opened, and outputs a control instruction to open the slide door to the body control device 250. In a case where a drink cup with no lid is recognized as an article carried by a user of the vehicle M, the article type recognizer 136 refers to the control content for each article type 194 to determine that a power window is controlled, and outputs a control instruction to open the power window to the body control device 250. Thereby, since the power window of the vehicle M is opened by the power window mechanism 254, a user can put the drink cup with no lid in the cup holder in the interior of the vehicle through the opened window portion and then board the vehicle M. That is, the article type recognizer 136 performs the control as described above, whereby it is possible to reduce the possibility of a user misplacing the drink cup with no lid on the roof portion of the vehicle M or another place in the parking area PA.

In a case where a fishing rod is recognized as an article carried by a user of the vehicle M, the article type recognizer 136 refers to the control content for each article type 194 to output a control instruction to open the rear hatch to the body control device 250. Thereby, since the rear hatch is opened by the door mechanism 252 of the body control device 250, a user can store a long object such as the fishing rod more smoothly in the interior of the vehicle.

In a case where an article vulnerable to a predetermined high temperature (an article which is easy to deteriorate in the case of a high temperature, including, for example, a fresh food, a precision machine or the like) is recognized as article carried by a user of the vehicle M, for example, like ice cream, the article type recognizer 136 refers to the control content for each article type 194 to output a control instruction to lower the temperature of the interior of the vehicle to the air-conditioning device 230. Thereby, the temperature of the interior of the vehicle is lowered by the air-conditioning device 230 in a case where the temperature of the interior of the vehicle is high, or a state in which the temperature of the interior of the vehicle is low is maintained, whereby it is possible to suppress the creation of environment in which an article that a user has taken into the interior of the vehicle M is easy to deteriorate.

For example, in a case where it is recognized in advance or predicted that an article vulnerable to a predetermined high temperature is brought in as an article carried by a user of the vehicle M, or case where it is estimated that a standby time of a predetermined time (for example, approximately 30 [min]) or more in the parking area PA occurs before a user of the vehicle M boards the vehicle, the article type recognizer 136 refers to the control content for each article type 194 to output a control instruction to the autonomous parking controller 142. The autonomous parking controller 142 determines that a standby position of the vehicle M is set as a stop position at which the temperature of the interior of the vehicle is easy to maintain at a cool temperature such as a shade, a underground parking lot or the like (for example, the parking space PS2 in FIG. 4), and changes the standby position of the vehicle M. Thereby, the temperature of the interior of the vehicle is easy to maintain, and thus it is possible to suppress the creation of environment in which an article that a user has taken into the interior of the vehicle M is easy to deteriorate, or to reduce the amount of operation of the air-conditioning device 230.

In a case where an article having low resistance to an impact, for example, like a wineglass is recognized as an article carried by a user of the vehicle M, the article type recognizer 136 refers to the control content for each article type 194 to determine that the degree of starting acceleration of the vehicle M is suppressed, and outputs a control instruction to suppress the degree of a target acceleration during starting to the autonomous parking controller 142 and the behavior plan generator 140. In a case where the degree of starting acceleration is suppressed, the behavior plan generator 140 may request the parking lot management device 400 to suppress the amount of travel of another vehicle (or, adjust an exit timing so that the vehicle M can exit a parking lot at a timing when the amount of travel of another vehicle within the parking lot is small) through the communication device 20 while the vehicle M travels within the parking lot after a user and an article are caused to board the vehicle in the stop area 310. In a case where the degree of starting acceleration is suppressed, the autonomous parking controller 142 and the behavior plan generator 140 may notify a nearby vehicle that the degree of acceleration is suppressed, and give way to another vehicle as necessary, or cause another vehicle to pass the vehicle M ahead.

Information relating to a space for the article type recognizer 136 to store the article using images having been captured by the in-vehicle camera 18 in the past may be further stored in the article type information 192. For example, in a case where the type of article is a baby carriage, the baby carriage can be maintained in a folded state in the interior of the vehicle, and thus a storage space required in reality may sometimes be made smaller in size than the article in the pickup area 320 recognized by the periphery recognizer 132.

The article type recognizer 136 may further recognize a user's article on the basis of a result of recognition of the user and his/her article included in an image of the pickup area 320 captured by the camera CM of the pickup area 320 or behavior information of the user in a visit destination facility. In the behavior information, for example, an entrance and exit time log in a visit destination facility may be used, settlement information of a user in a shopping mall may be included in a case where the visit destination facility is a shopping mall, or an attendance log or timetable information in an educational institution may be included in a case where the visit destination facility is an educational institution. In the behavior information of a user, information included in the user's scheduler may be shared by an external terminal used by the user (for example, a smartphone or a tablet terminal) or the like and the communication device 20 of the vehicle M communicating with each other in a wireless manner.

In a case where the total amount of the recognized articles is equal to or greater than a predetermined amount, similarly to the case where an article having low resistance to an impact is recognized, the article type recognizer 136 may request an external device such as the parking lot management device 400 to suppress the amount of travel of another vehicle near the vehicle M through the communication device 20.

[Determination of Control Target]

In a case where the number of users in the vehicle M falls below a fixed number of users in the vehicle M, and there is sufficient room in the interior of the vehicle even when articles of the users are stored in the vehicle M, that is, a case where the users may sit on any seats in the vehicle M, there is the possibility of the users' seating positions not being able to be predicted in advance. In such a situation, in a case where the article type recognizer 136 recognizes the types of article carried by the users, and refers to the control content for each article type 194 to determine in advance that the door mechanism 252 or the power window mechanism 254 is controlled, the recognizer may determine which door mechanism 252 or which power window mechanism 254 is opened and closed among a plurality of door mechanisms 252 and a plurality of power window mechanisms 254 in a stage in which the users approach the vehicle and the users can be recognized by the periphery recognizer 132.

Figure 8:
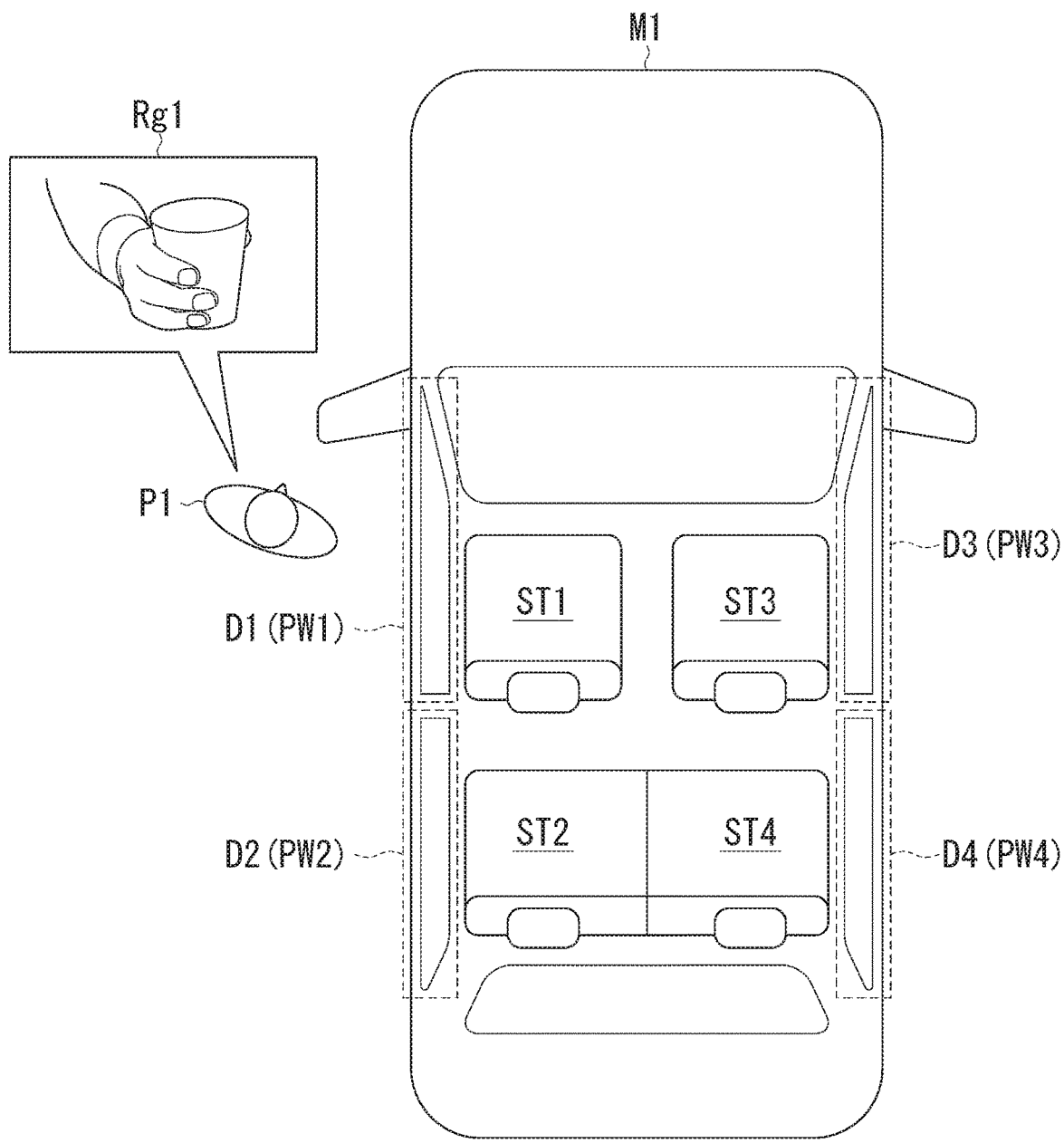
FIG. 8 is a top view illustrating a positional relationship between a vehicle and its user.

FIG. 8 is a top view illustrating a positional relationship between a vehicle M1 and a user P1. In the following description, the vehicle M1 is assumed to be the vehicle M associated with the user P1. In the following description, the vehicle M1 is assumed to include four seats ST1 to ST4, and include doors D1 to D4 adjacent to the respective seats. In the following description, a seat corresponding to a driver's seat is assumed to be the seat ST3, and a seat having a high possibility of the user P1 sitting thereon. In the following description, the doors D1 to D4 are assumed to include power windows PW1 to PW4, respectively. In the following description, the number of users P1 of the vehicle M1 is assumed to be one.

The periphery recognizer 132 recognizes that the user P1 is located close to the door D1 as shown in the drawing. The article type recognizer 136 recognizes a drink cup with no lid as an article Rg1 of the user P1, and refers to the control content for each article type 194 to determine to perform control for opening any of the power windows PW1 to PW4. In this case, it may be determined that the power window PW1 closest to the user P1 is opened, or it may be determined that the power window PW3 adjacent to the seat ST3 having a high possibility of the user P1 sitting thereon is opened. It may be determined that both the power window PW1 and the power window PW3 are opened. Which of power window PW1 and the power window PW3 is preferentially opened may be set in advance by the user P1.

In a case where the periphery recognizer 132 recognizes that the article Rg1 of the user P1 is stored in the interior of the vehicle, and recognizes that the user P1 takes his/her arm, upper half of the body, or the like put into the interior of the vehicle through the opened portion of a power window out of the vehicle, the periphery recognizer may perform control for closing the power window mechanism 254 having performed opening control, and next opening and closing the door mechanism 252 used for the user P1 to board and exit the vehicle.

[Seat Arrangement]

Figure 9:
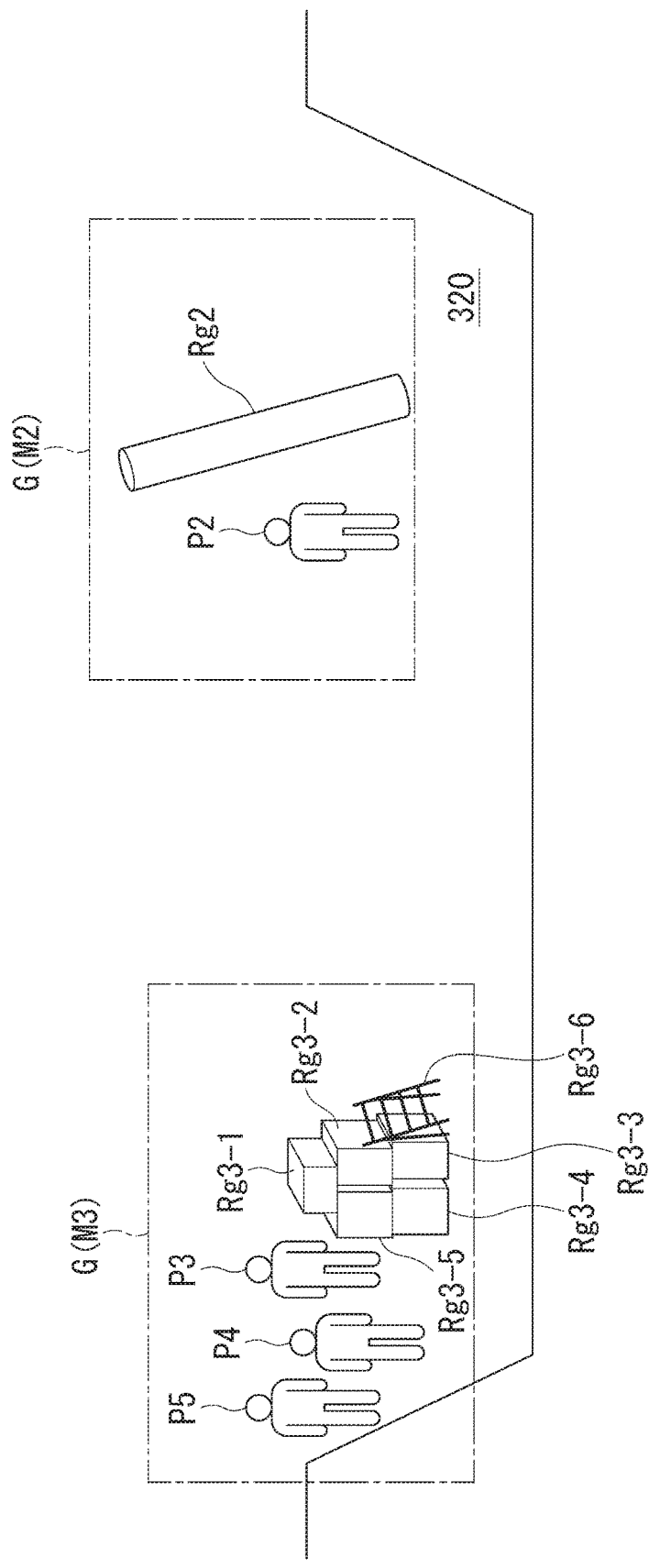
FIG. 9 is a schematic diagram illustrating an example of an image of a pickup area captured by a camera.

Hereinafter, an example of control performed by the seat arrangement device 240 according to the recognition result of the article type recognizer 136 will be described. FIG. 9 is a schematic diagram illustrating an example of an image including the pickup area 320 captured by the camera CM.

The periphery recognizer 132 acquires an image shown in FIG. 9 captured by the camera CM, and recognizes a group G (M2) composed of a user P2 and an article Rg2 of the user which are present inside the pickup area 320. The article type recognizer 136 recognizes the type of article Rg2 recognized by the periphery recognizer 132, and recognizes that the article Rg2 corresponds to a long object (for example, a fishing rod). The long object refers to, for example, an object having a length exceeding a maximum length that can be taken in a luggage space, and in the following description, a vehicle M associated with the user P2 is referred to as a vehicle M2.

In a case where an article that is a long object is recognized by the article type recognizer 136, the seat arrangement device 240 of the vehicle M2 drives the seat mechanism 242 in a mode in which the long object can be received. In a case where there is an exclusive storage space for storing the long object (for example, a holder capable of installing the long object along the ceiling of the interior of the vehicle M2) in the vehicle M2, the article type recognizer 136 first determines whether the article Rg2 can be stored in the exclusive storage space on the basis of an image of the interior of the vehicle M2 captured by the in-vehicle camera 18, or the like. In a case where it is determined that storage in the exclusive storage space is possible, the article type recognizer 136 estimates that the user P2 stores the article Rg2 in the exclusive storage space, and determines that the seat mechanism 242 is not driven. In a case where it is determined that storage in the exclusive storage space is not possible, the article type recognizer 136 determines that a space for storing the article Rg2 by driving the seat mechanism 242 is prepared.

Figure 10:
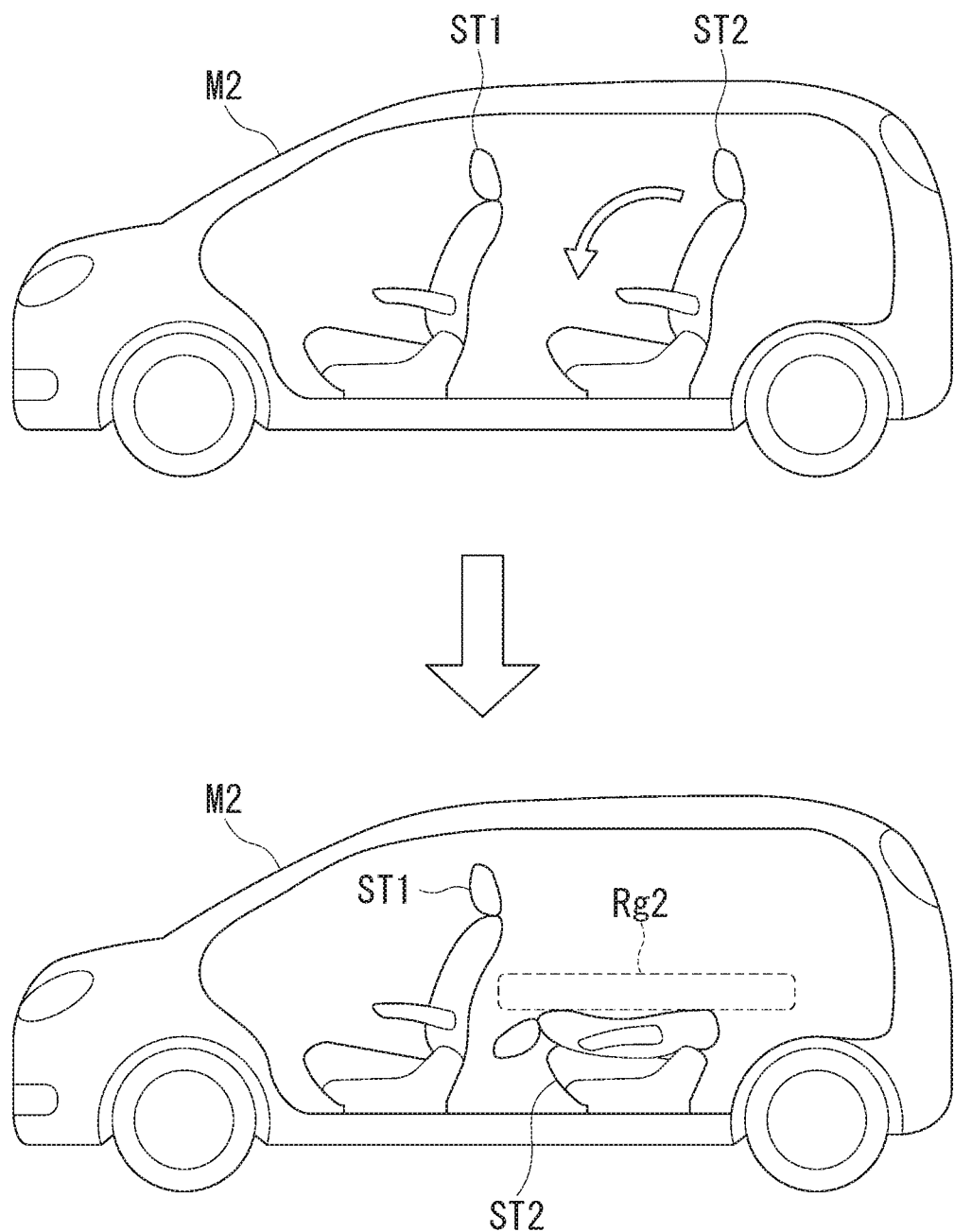
FIG. 10 is a top view illustrating a driving example of a seat arrangement device in a vehicle.

FIG. 10 is a top view illustrating a driving example of the seat arrangement device 240 in the vehicle M2. The article type recognizer 136 outputs the recognition result of the article Rg2 to the seat arrangement device 240. For example, as shown in FIG. 10, the seat arrangement device 240 performs seat arrangement so that the seat mechanism 242 is caused to lay the backrest of the seat ST2 located on the rear portion side of the interior of the vehicle M2 down toward the seat surface of the seat ST2, and that a space on the rear portion side of the interior of the vehicle M2 can be secured to such an extent that the article Rg2 is able to be received. Although an example in which the seat arrangement device 240 lays the backrest of the seat ST2 down has been given, a space may be created at the center by extending a seat interval between the seat ST1 and the seat ST3, or a space for loading a long object on either side in the interior of the vehicle may be created by pushing all of the seats ST1 to ST4 to either side, or the like.

[Provision of Information Relating to Boarding Order and Loading Order]

In a case where users and articles which are on board a vehicle having a predetermined number of seats are recognized by the periphery recognizer 132, the article type recognizer 136 drives the seat mechanism 242 in a mode in which all the users and all the articles can be received in the vehicle M. The periphery recognizer 132 acquires, for example, the image shown in FIG. 9 of the pickup area 320 captured by the camera CM, and recognizes a group G (M3) composed of users P3 to P5 and articles Rg3-1 to Rg3-6 of the users. The seat arrangement device 240 drives the seat mechanism 242 in a mode in which the users P3 to P5 that are all the users recognized by the periphery recognizer 132 and the articles Rg3-1 to Rg3-6 that are all the articles recognized by the article type recognizer 136 can be received in the vehicle. In the following description, a vehicle M associated with the users P3 to P5 is referred to as a vehicle M3.

Figure 11:
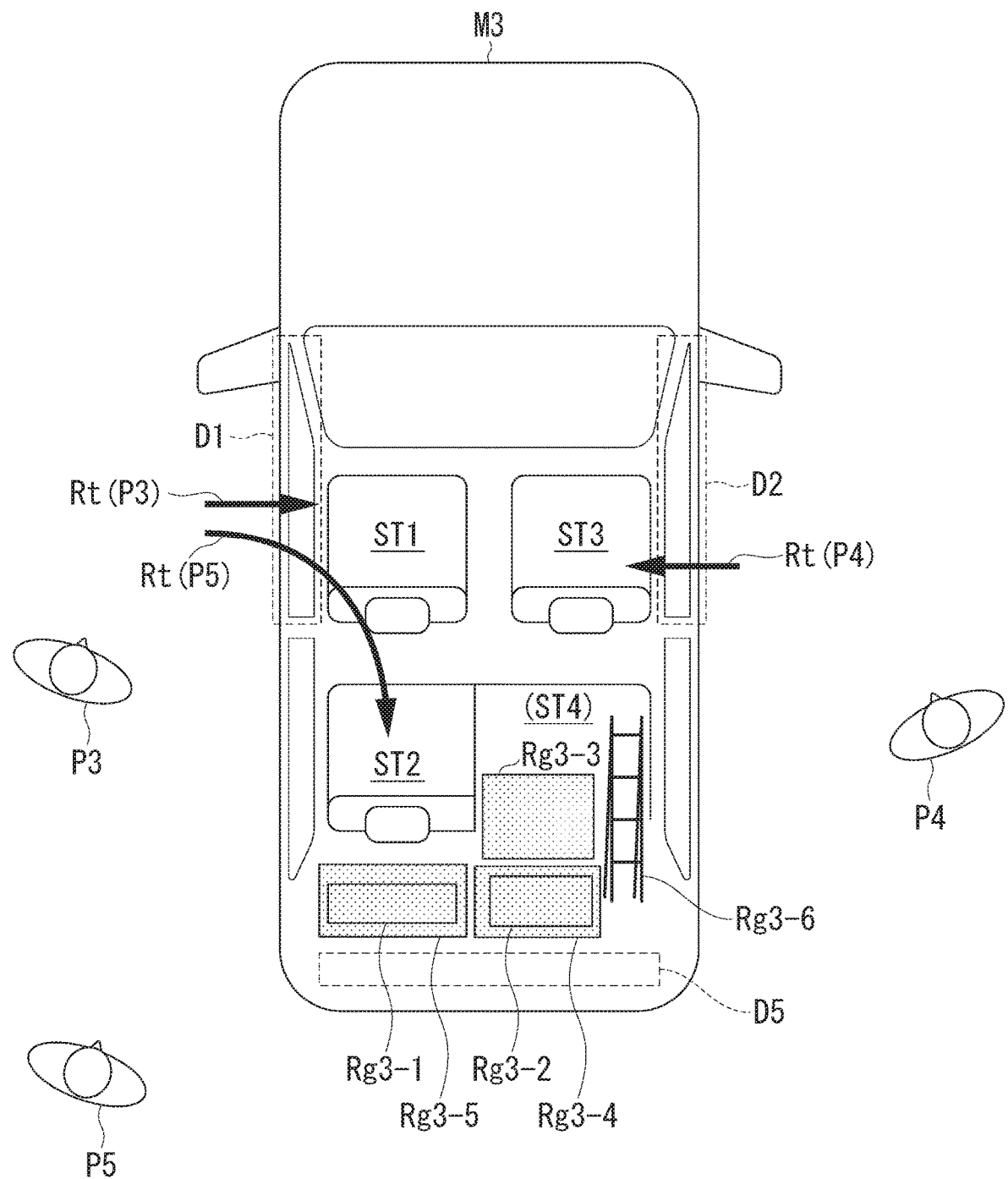
FIG. 11 is a diagram illustrating an example of the arrangement of seats for receiving all of users and articles in the vehicle using the seat arrangement device.

FIG. 11 is a diagram illustrating an example of seat arrangement for receiving all of users and articles in the vehicle M3 using the seat arrangement device 240. For example, as shown in FIG. 11, the seat arrangement device 240 first sets seats ST1 to ST3 on which the users P3 to P5 sit and boarding and exit routes of the users (Rt(P3) to Rt(P5): Rt(P3) indicates a boarding and exit route of the user P3), and tentatively determines the boarding order of the users P3 to P5. Next, the seat arrangement device 240 determines a seat ST4 other than the tentatively determined seats, places in which the articles Rg3-1 to Rg3-6 are received in the storage space of the vehicle M3, and the loading order of the articles. At this time, in a case where positions at which the users P3 to P5 are scheduled to exit the vehicle are different from each other, the seat arrangement device 240 further adds content as to which of the users P3 to P5 possess which of the articles Rg3-1 to Rg3-6, and may determine the boarding order and the loading order of the articles in order to make it easy for a user who exits the vehicle first to exit the vehicle, and to make it easy for an article carried by the user who exits the vehicle first to be taken out.

The seat arrangement device 240 determines that, for example, the backrest of the seat ST4 is laid down toward the seat surface to secure the storage space, and the article Rg3-3 is received on the seat ST4. Next, the seat arrangement device 240 determines that the door D5 is opened, the article Rg3-4 and the article Rg3-5 are received in the rear portion of the seat ST2, and the article Rg3-6 is further received on the seat ST4 (next to the article Rg3-3 received first). The seat arrangement device 240 finally determines that the article Rg3-1 is stacked on the article Rg3-5, and the article Rg3-2 is stacked on the article Rg3-4.

The seat arrangement device 240 determines the boarding order that, after the articles Rg3-1 to Rg3-6 are received, the user P3 boards the vehicle through the door D1, and next the user P5 boards the vehicle. The seat arrangement device 240 determines the boarding order that the articles Rg3-1 to Rg3-6 are received, and then the user P4 boards the vehicle through the door D2.

The seat arrangement device 240 may provide the users with the seating positions or the seating order of the users P3 to P5 and the receiving positions or the loading order of the articles Rg3-1 to Rg3-6 determined as described above. In that case, the seat arrangement device 240 may provide the users P3 to P5 who board the vehicle M3, through the display or speaker of the HMI 30, with information relating to the seating positions or the seating order of the users P3 to P5 and the receiving positions or the loading order of the articles Rg3-1 to Rg3-6. Before vehicle M3 arrives at the stop area 310, the seat arrangement device 240 may transmit the information relating to the seating positions or the seating order of the users P3 to P5 and the receiving positions or the loading order of the articles Rg3-1 to Rg3-6 to an external terminal (for example, a smartphone or a tablet terminal) used by at least any of the users P3 to P5 through the communication device 20.

The seat arrangement device 240 performs control until arrival at the stop area 310 and executes the seat arrangement determined as described.

The autonomous parking controller 142 stops the vehicle M3 so that the door mechanism 252 and the user according to the boarding and exit route of the user determined in advance as described above (for example, the door D1 and the user P3 or the door D2 and the user P4 in the drawing) approach each other in the stop area 310 in which the users P3 to P5 board the vehicle M3.

[Process Flow 1]

Figure 12:
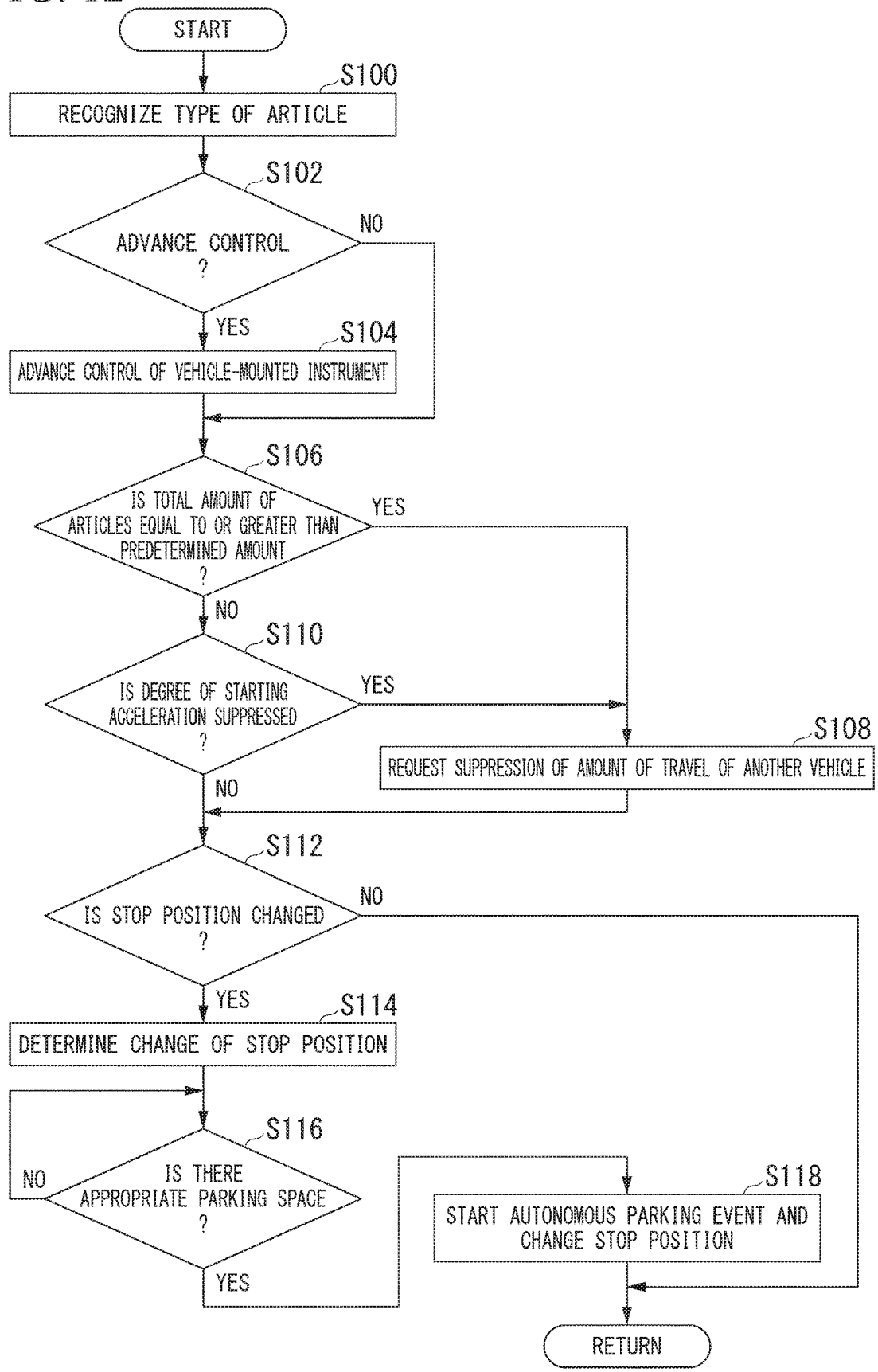
FIG. 12 is a flow chart illustrating an example of a flow of processes when an automated driving controller controls a mode of use of a vehicle-mounted device of a vehicle M in accordance with the type of article carried by a user of the vehicle M before pickup.

FIG. 12 is a flow chart illustrating an example of a flow of processes when the automated driving controller 100 controls a mode of use of a vehicle-mounted device of the vehicle M in accordance with the type of article carried by a user of the vehicle M before pickup. The present flow chart may be periodically performed for a standby time when the vehicle M starts the autonomous parking event during entry or until the vehicle starts the autonomous parking event during exit. Processing of the present flow chart, for example, may be performed when a user exits the vehicle M, may be performed during standby in the parking space PS, or may be performed when the vehicle M receives activity information of a user.

First, the article type recognizer 136 recognizes the type of article carried by a user (step S100). The articles of the user recognized in step S100 may include an article left in the interior of a vehicle, in addition to an article that the user has taken out of the vehicle or an article obtained outside of the vehicle. Next, the article type recognizer 136 refers to the control content for each article type 194 associated with the recognized type of article, and determines whether a vehicle-mounted instrument such as the air-conditioning device 230 is caused to perform advance control (step S102). In a case where it is determined that the advance control is performed, the advance control of a vehicle-mounted instrument which is a target is started (step S104). In a case where it is determined that the advance control is not performed, the recognizer advances the process to step S106.

Next, the article type recognizer 136 determines whether the total amount of the articles recognized in the process of step S100 is equal to or greater than a predetermined amount (step S106). In a case where it is determined that the total amount of the articles is equal to or greater than the predetermined amount, the article type recognizer 136 requests the parking lot management device 400 or the like to suppress the amount of travel of another vehicle (step S108), and advances the process to step S112. In a case where it is determined that the total amount of the articles is not equal to or greater than the predetermined amount (less than the predetermined amount), the article type recognizer 136 next refers to the control content for each article type 194, and determines whether the degree of starting acceleration is suppressed on the basis of goods included in the articles (step S110). In a case where it is determined that the degree of starting acceleration is suppressed, the article type recognizer 136 advances the process to step S108. In a case where it is determined that the degree of starting acceleration is not suppressed, the article type recognizer 136 advances the process to step S112.

Next, the article type recognizer 136 refers to the control content for each article type 194, and determines whether the stop position of the vehicle M is changed (step S112). In a case where it is determined that the stop position is not changed, the article type recognizer 136 terminates the processing of the present flow chart. In a case where it is determined that the stop position is changed, the autonomous parking controller 142 determines that the vehicle M is started to move to a stop position at which the temperature of the interior of the vehicle is easy to maintain at a cool temperature (step S114). Next, the autonomous parking controller 142 determines whether there is an appropriate parking space (for example, the parking space PS2 in FIG. 4) (step S116). Meanwhile, in the process of step S116, when an appropriate parking space is found, the autonomous parking controller 142 may request the parking lot management device 400 to move the vehicle M to a parking space satisfying conditions through the communication device 20, to make a determination on the basis of a response from the parking lot management device 400 or to search for a parking space satisfying conditions while the vehicle M travels autonomously within a parking lot. In a case where it is determined that there is no appropriate parking space, the autonomous parking controller 142 performs the process of step S116 again after the elapse of a certain period of time. In a case where it is determined that there is an appropriate parking space, the autonomous parking controller 142 starts the autonomous parking event, and changes the stop position to the appropriate parking space (step S118). This concludes the description of the processing of the present flow chart.

[Process Flow 2]

Figure 13:
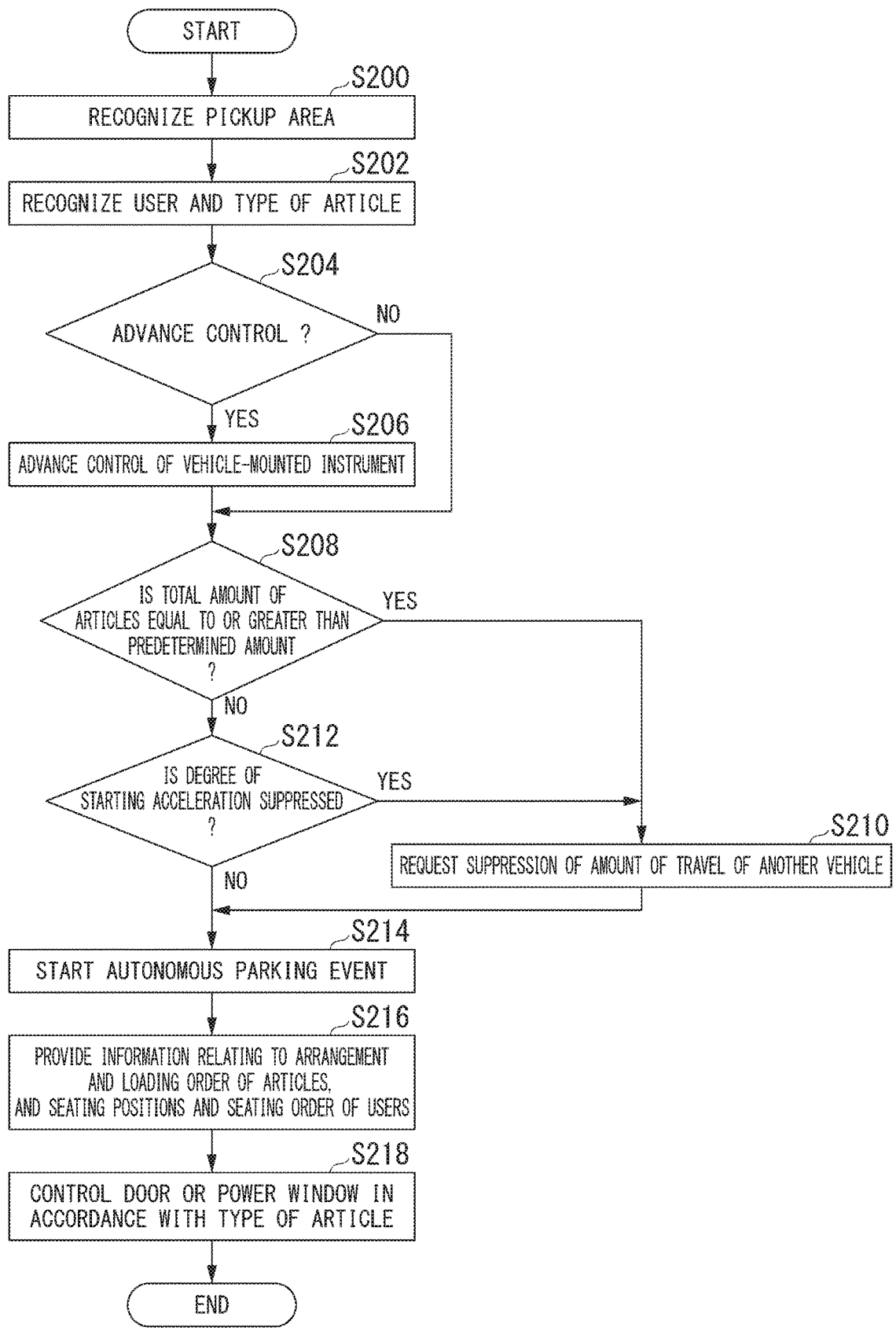
FIG. 13 is a flow chart illustrating an example of a flow of processes when the automated driving controller controls a mode of use of the vehicle-mounted device of the vehicle M in accordance with the type of article carried by the user of the vehicle M during pickup.

FIG. 13 is a flow chart illustrating an example of a flow of processes when the automated driving controller 100 controls a mode of use of the vehicle-mounted device of the vehicle M in accordance with the type of article carried by the user of the vehicle M during pickup. The processes of step S204 to step S206 shown in FIG. 13 are the processes associated with step S106 to step S110 shown in FIG. 12. Therefore, in a case where a request for suppressing a traffic volume of other vehicles which is the process of step S108 before pickup is already performed, and the process result at that time is also effective during start of step S204, the processes described in step S204 to step S206 may be omitted.

First, the periphery recognizer 132 recognizes a user of the vehicle M in the pickup area 320 and an article associated with the user (step S200). Next, the article type recognizer 136 recognizes the user and the type of article recognized in the process of step S200 (step S202).

Next, the air-conditioning device 230 and the seat arrangement device 240 determines whether each device is caused to perform the advance control in accordance with the type of article recognized by the article type recognizer 136 (step S204). The advance control includes making adjustment to lower the temperature of the interior of the vehicle M by bringing the air-conditioning device 230 into operation in advance, or performing seat arrangement by driving the seat arrangement device 240 in advance. In a case where it is determined that the advance control is performed, the air-conditioning device 230 and the seat arrangement device 240 controls each device in advance in accordance with the type of article recognized by the article type recognizer 136 (step S206). In a case where it is determined that the advance control is not performed, the article type recognizer 136 advances the process to step S208.

Next, the article type recognizer 136 determines whether the total amount of the articles recognized in the process of step S200 is equal to or greater than a predetermined amount (step S208). In a case where it is determined that the total amount of the articles is equal to or greater than the predetermined amount, the article type recognizer 136 requests the parking lot management device 400 or the like to suppress the amount of travel of another vehicle (step S210), and advances the process to step S214. In a case where it is determined that the total amount of the articles is not equal to or greater than the predetermined amount (less than the predetermined amount), the article type recognizer 136 next refers to the control content for each article type 194, and determines whether the degree of starting acceleration is suppressed on the basis of goods included in the articles (step S212). In a case where it is determined that the degree of starting acceleration is suppressed, the article type recognizer 136 advances the process to step S210. In a case where it is determined that the degree of starting acceleration is not suppressed, the article type recognizer 136 advances the process to step S214.

Next, the autonomous parking controller 142 starts an autonomous parking event during exit, and causes the vehicle M to proceed to the stop area 310 (step S214). Next, in a case where the autonomous parking controller 142 stops in the stop area 310, the HMI 30 provides users with information relating to the arrangement and the loading order of articles, and the seating positions and the seating order of the users (step S216). Next, the body control device 250 controls the door mechanism 252 or the power window mechanism 254 in accordance with the type of article recognized by the article type recognizer 136 (step S218). This concludes the description of the processing of the present flow chart.

According to the embodiment described above, the article type recognizer 136 that recognizes the presence or absence and type of article carried by a user who uses the vehicle M and the body control device 250 that controls the door mechanism 252 or the power window mechanism 254 which is a vehicle-mounted instrument are included, and the body control device 250 determines a mode of control of the door mechanism 252 or the power window mechanism 254 on the basis of the recognition result of the recognizer 130, whereby it is possible to control an appropriate mode of use of the vehicle-mounted instrument in accordance with the type of article carried by the user.

According to the embodiment described above, the air-conditioning device 230 determines a mode of control of the air conditioner ECU on the basis of the recognition result of the article type recognizer 136, whereby it is possible to control an appropriate operation of the air-conditioning device 230 in accordance with the type of article carried by the user.

According to the embodiment described above, the seat arrangement device 240 determines a mode of control of the seat mechanism 242 on the basis of the recognition result of the article type recognizer 136, whereby appropriate seat arrangement can be realized in accordance with the type of article carried by the user.

[Hardware Configuration]

Figure 14:
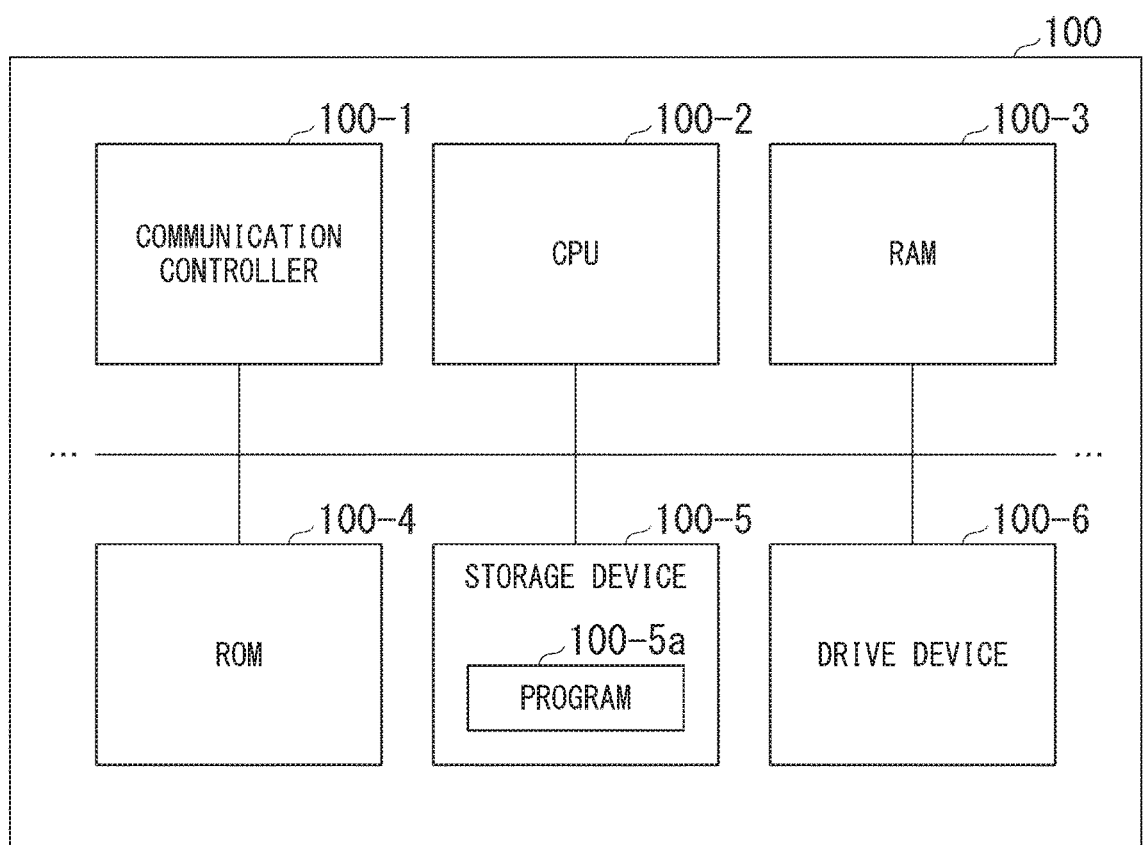
FIG. 14 is a diagram illustrating an example of a hardware configuration of the automated driving controller according to the embodiment.

FIG. 14 is a diagram illustrating an example of a hardware configuration of the automated driving controller 100 of the embodiment. As shown in the drawing, the automated driving controller 100 is configured such that a communication controller 100-1, a CPU 100-2, a RAM 100-3 used as a working memory, a ROM 100-4 that stores a boot program or the like, a storage device 100-5 such as a flash memory or an HDD, a drive device 100-6, and the like are connected to each other through an internal bus or a dedicated communication line. The communication controller 100-1 performs communication with components other than the automated driving controller 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the first controller 120 and the second controller 160 are realized.

The above-described embodiment can be represented as follows.

A vehicle control device including:
a storage device having a program stored therein; and
a hardware processor,
wherein the hardware processor executes the program stored in the storage device, to thereby
recognize the presence or absence and type of an article carried by a user who uses a vehicle, and
determine a mode of control of a vehicle-mounted instrument on the basis of a recognition result.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in a case where a freezer, a refrigerator, or a food heating device is installed in a vehicle, the freezer, the refrigerator, or the food heating device may be set to have a temperature appropriate for the type of article recognized by the article type recognizer 136 instead of lowering the temperature of the interior of the vehicle by bringing the air-conditioning device 230 into operation.

What is claimed is:

1. A vehicle control device comprising:
a recognizer that recognizes the presence or absence and type of article carried by a user who uses a vehicle; and
an instrument controller that controls a vehicle-mounted instrument,
wherein the instrument controller determines a mode of control of the vehicle-mounted instrument on the basis of a recognition result of the recognizer,
wherein the recognizer further recognizes a peripheral situation of the vehicle,
the vehicle control device further comprises a driving controller that controls steering and speed of the vehicle irrespective of the user's operation on the basis of a recognition result of the peripheral situation of the recognizer,
the instrument controller drives a seat mechanism of the vehicle based on the recognition result, and sets a boarding and exit route of the user according to driving of the seat mechanism, and
the driving controller stops the vehicle so that the opening and closing mechanism and the user according to the boarding and exit route approach each other in a stop area in which the user boards the vehicle.

2. The vehicle control device according to claim 1, wherein the instrument controller is able to control a plurality of opening and closing mechanisms of the vehicle, and determines an opening and closing mechanism to be opened and closed among the plurality of opening and closing mechanisms on the basis of the recognition result of the recognizer.

3. The vehicle control device according to claim 2, wherein, in a case where it is recognized by the recognizer that the user holds a drink, the instrument controller determines an opening and closing mechanism to be opened and closed among the plurality of opening and closing mechanisms on the basis of whether a lid is attached to a container that contains the drink.

4. The vehicle control device according to claim 2, wherein some or all of a hinge door, a slide door, a power window, and a rear hatch of the vehicle are included in the opening and closing mechanism.

5. The vehicle control device according to claim 2, wherein the instrument controller drives a seat mechanism of the vehicle, and in a case where an article that is a long object is recognized by the recognizer, drives the seat mechanism in a mode in which the long object is able to be received.

6. The vehicle control device according to claim 5, wherein, in a case where the users and the articles which are on board a vehicle having a predetermined number of seats are recognized by the recognizer, the instrument controller drives the seat mechanism in a mode in which all the users and all the articles are able to be received in the vehicle.

7. The vehicle control device according to claim 6, wherein, in a case where the seat mechanism is driven in the mode in which all the users and all the articles are able to be received in the vehicle, the instrument controller notifies the users of a loading order of the articles and a boarding orders of the users.

8. The vehicle control device according to claim 1, further comprising a notifier that notifies an external device of information relating to the vehicle,
wherein, in a case where the article recognized by the recognizer amounts to a predetermined amount or more, the notifier requests the external device to suppress an amount of travel of another vehicle near the vehicle.

9. The vehicle control device according to claim 1, wherein the instrument controller is able to control an air-conditioning device, and lowers a temperature of an interior of the vehicle by controlling the air-conditioning device in a case where it is recognized by the recognizer that the article is an article vulnerable to a predetermined high temperature.

10. The vehicle control device according to claim 9, wherein the driving controller determines a stop position at which the temperature of the interior of the vehicle of the vehicle is easy to maintain at a cool temperature as a stop position of the vehicle.

11. The vehicle control device according to claim 1, wherein, when the vehicle is started with the user and the article loaded, the driving controller changes a degree of starting acceleration of the vehicle in accordance with the type of article recognized by the recognizer.

12. The vehicle control device according to claim 11, further comprising a notifier that notifies an external device of information relating to the vehicle,
wherein the notifier requests the external device to suppress an amount of travel of another vehicle near the vehicle in a case where the degree of starting acceleration is changed by the driving controller.

13. A vehicle control method comprising causing a vehicle control device to:
recognize the presence or absence and type of article carried by a user who uses a vehicle;
determine a mode of control of a vehicle-mounted instrument on the basis of a recognition result,
recognize a peripheral situation of the vehicle;

control steering and speed of the vehicle irrespective of the user's operation on the basis of a recognition result of the peripheral situation;

drive a seat mechanism of the vehicle based on the recognition result;

set a boarding and exit route of the user according to driving of the seat mechanism; and stop the vehicle so that the opening and closing mechanism and the user according to the boarding and exit route approach each other in a stop area in which the user boards the vehicle.

14. A computer readable non-transitory storage medium having a program stored therein, the program causing a vehicle control device to:

recognize the presence or absence and type of article carried by a user who uses a vehicle;

determine a mode of control of a vehicle-mounted instrument on the basis of a recognition result, recognize a peripheral situation of the vehicle;

control steering and speed of the vehicle irrespective of the user's operation on the basis of a recognition result of the peripheral situation;

drive a seat mechanism of the vehicle based on the recognition result;

set a boarding and exit route of the user according to driving of the seat mechanism; and stop the vehicle so that the opening and closing mechanism and the user according to the boarding and exit route approach each other in a stop area in which the user boards the vehicle.

* * * * *